US012759948B2

(12) United States Patent
Ohta et al.

(10) Patent No.: US 12,759,948 B2
(45) Date of Patent: Oct. 13, 2026

(54) CERAMIC MATRIX COMPOSITE AND METHOD FOR PRODUCING THE SAME

(71) Applicant: TOSOH CORPORATION, Shunan (JP)

(72) Inventors: Ikuya Ohta, Ayase (JP); Yushi Nawata, Ayase (JP); Yo Hirataka, Ayase (JP); Isao Yamashita, Ayase (JP)

(73) Assignee: TOSOH CORPORATION, Shunan (JP)

( * ) Notice: Subject to any disclaimer, the term of this patent is extended or adjusted under 35 U.S.C. 154(b) by 601 days.

(21) Appl. No.: 18/269,278

(22) PCT Filed: Dec. 21, 2021

(86) PCT No.: PCT/JP2021/047398
§ 371 (c)(1),
(2) Date: Jun. 22, 2023

(87) PCT Pub. No.: WO2022/138664
PCT Pub. Date: Jun. 30, 2022

(65) Prior Publication Data
US 2024/0051881 A1 Feb. 15, 2024

(30) Foreign Application Priority Data
Dec. 25, 2020 (JP) ................................ 2020-216328

(51) Int. Cl.
*C04B 35/80* (2006.01)
*C04B 35/628* (2006.01)
(Continued)

(52) U.S. Cl.
CPC ........ *C04B 35/80* (2013.01); *C04B 35/62852* (2013.01); *C04B 35/62886* (2013.01);
(Continued)

(58) Field of Classification Search
CPC .............. C04B 35/80; C04B 35/62852; C04B 35/62886; C04B 35/6303; C04B 35/64;
(Continued)

(56) References Cited

U.S. PATENT DOCUMENTS

2022/0185742 A1 6/2022 Yamashita et al.

FOREIGN PATENT DOCUMENTS

CN 106904952 A * 6/2017 ............. C04B 35/14
CN 110526728 A * 12/2019 ........... C04B 35/622
(Continued)

OTHER PUBLICATIONS

International Preliminary Report on Patentability mailed Jun. 13, 2023, for International Application No. PCT/JP2021/047398, with English translation, 5 pages.
(Continued)

*Primary Examiner* — Noah S Wiese
(74) *Attorney, Agent, or Firm* — Squire Patton Boggs (US) LLP

(57) ABSTRACT

An object is to provide a ceramic matrix composite (CMC) having a tensile strength of 150 MPa or more and high heat resistance such that the ratio at which the tensile strength of the CMC retains after the CMC has been exposed to a high-temperature environment for a long period of time, that is, at 1200° C. for 100 hours, is 80% or more. A ceramic matrix composite comprising a ceramic matrix and a continuous ceramic fiber, the ceramic matrix including a sintering inhibitor having an average particle size of 0.28 µm or less.

6 Claims, 2 Drawing Sheets

(51) Int. Cl.
*C04B 35/63* (2006.01)
*C04B 35/64* (2006.01)

(52) U.S. Cl.
CPC .......... *C04B 35/6303* (2013.01); *C04B 35/64* (2013.01); *C04B 2235/3217* (2013.01); *C04B 2235/3418* (2013.01); *C04B 2235/5228* (2013.01); *C04B 2235/5256* (2013.01); *C04B 2235/5445* (2013.01); *C04B 2235/606* (2013.01); *C04B 2235/96* (2013.01)

(58) Field of Classification Search
CPC . C04B 35/6264; C04B 35/117; C04B 35/185; C04B 35/488; C04B 2235/785
See application file for complete search history.

(56) References Cited

FOREIGN PATENT DOCUMENTS

| | | | |
|---|---|---|---|
| JP | H02-296770 | A | 12/1990 |
| JP | H04-2673 | A | 1/1992 |
| JP | H09-77570 | A | 3/1997 |
| JP | 2001-058880 | A | 3/2001 |
| JP | 2018-039691 | A | 3/2018 |
| WO | WO 2020/203484 | A1 | 10/2020 |

OTHER PUBLICATIONS

International Search Report mailed Feb. 22, 2022, for International Application No. PCT/JP2021/047398, with English translation, 5 pages.
Galusek et al., "The Influence of Additives on Microstructure of Sub-Micron Alumina Ceramics Prepared by Two-Stage Sintering," J. Euro. Ceram. Soc., vol. 32, 2012, pp. 1965-1970, 6 pages.
Levi et al., "Processing and Performance of an All-Oxide Ceramic Composite", J. Am. Ceram. Soc., vol. 81(8), 1998, pp. 2077-2086, 10 pages.
Parlier et al., "Potential and Perspectives for Oxide/Oxide Composites", J. Aerospace Lab, vol. 3, 2011, pp. 1-12, 13 pages.
Wang et al., "Atomic Structural Environment of Grain Boundary Segregated Y and Zr in Creep Resistant Alumina from EXAFS", Acta Mater., vol. 47(12), 1999, pp. 3411-3422, 12 pages.
Extended European Search Report dated Jan. 9, 2025, for European Patent Application No. 21910804.0, 8 pages.
Pirzada, "Oxide based ceramic matrix composites for high temperature aerospace sealing applications", University of Oxford, Dphil in Materials Science, Dec. 2021, 263 pages.

* cited by examiner

CERAMIC MATRIX COMPOSITE AND METHOD FOR PRODUCING THE SAME

CROSS-REFERENCE TO RELATED APPLICATIONS

This application is a National Stage filing under 35 U.S.C. § 371 of International Patent Application No. PCT/JP2021/047398, filed Dec. 21, 2021, which claims the benefit of and priority to Japanese Patent Application No. 2020-216328, filed Dec. 25, 2020, the contents of all of which are hereby incorporated by reference in their entireties for all purposes.

TECHNICAL FIELD

The present invention relates to a ceramic matrix composite and a method for producing the ceramic matrix composite.

BACKGROUND ART

Ceramic matrix composites (hereinafter, also referred to as "CMCs"), which are composites consisting of a continuous ceramic fiber and a ceramic matrix, have high resistance (damage tolerance) to entire fracture caused due to propagation of flaws, compared with common ceramics. Thus, there have been studies of using CMCs as alternative materials to heat-resistant metals, such as Ni-based alloys.

CMCs that are composites consisting of alumina or a mullite-based oxide serving as a continuous ceramic fiber and a ceramic matrix (hereinafter, also referred to as "oxide-based CMCs") have a heat resistance of 1200° C. Therefore, it is anticipated that oxide-based CMCs are used as members for aircraft jet engines (see NPL 1).

One of the known methods for producing an oxide-based CMC is a method including impregnating a continuous ceramic fiber with a slurry (hereinafter, also referred to as "matrix slurry") prepared by dispersing a ceramic matrix raw-material powder in a solvent, such as water, subsequently performing drying to prepare a green body, and sintering the green body at 1000° C. or more to form an oxide-based CMC (see NPL 2).

CITATION LIST

Non Patent Literature

NPL 1: J. AerospaceLab, Issue 3, (2011) 1-12.
NPL 2: J. Am. Ceram. Soc., 81[8], (1998) 2077-86.
NPL 3: Acta Mater., 47[12], (1999) 3411-3422
NPL 4: J. Euro. Ceram. Soc., 32, (2012) 1965-1970

SUMMARY OF INVENTION

Technical Problem

In general, when an oxide-based CMC is exposed to a high temperature of 1000° C. or more for a long period of time, ceramic grains included in the ceramic matrix (i.e., ceramic grains constituting the ceramic matrix) grow by heat. This results in a reduction in the porosity of the ceramic matrix and fixation of the ceramic matrix and the continuous ceramic fiber to each other and consequently reduces the strength of the CMC. Accordingly, there has been attempt to suppress the growth of ceramic grains by adding magnesia or zirconia, which serves as a sintering inhibitor, to the ceramic matrix (see NPLs 3 and 4). However, oxide-based CMCs produced in NPLs above all have a low tensile strength. Furthermore, the strengths of the oxide-based CMCs significantly reduce when the oxide-based CMCs are exposed to a high-temperature environment.

An object of the present invention is to provide at least one selected from a ceramic composite having a high tensile strength, wherein a reduction in the strength of the ceramic composite which occurs when the ceramic composite is subjected to a heat exposure treatment is limited, and a method for producing the ceramic composite.

Solution to Problem

The inventors of the present invention attempted to add a sintering inhibitor to a ceramic matrix raw-material and prepared CMCs including a ceramic matrix, a continuous ceramic fiber and a sintering inhibitor. Consequently, the inventors of the present invention found a CMC in which the growth of ceramic grains included in the ceramic matrix is suppressed and the strength of which is unlikely to reduce even when the CMC is exposed to a high-temperature environment of 1200° C. Moreover, the inventors of the present invention focused attention on the average particle size of the sintering inhibitor and found a CMC capable of maintaining a high strength by adjusting the above average particle size. Thus, the present invention was made.

Specifically, the present invention is as described in the claims. The summary of the present disclosure is as follows.

[1] A ceramic matrix composite comprising a ceramic matrix and a continuous ceramic fiber, the ceramic matrix including a sintering inhibitor having an average particle size of 0.28 μm or less.

[2] The ceramic matrix composite according to [1], wherein an average distance between centers of gravity of particles of the sintering inhibitor is 4.5 μm or less.

[3] The ceramic matrix composite according to [1] or [2], wherein the sintering inhibitor is one or more selected from the group consisting of silica, zirconia, yttria, magnesia, mullite and strontium oxide.

[4] The ceramic matrix composite according to any one of [1] to [3], wherein the continuous ceramic fiber is a continuous fiber composed of one or more oxide ceramics selected from the group consisting of alumina, silica, mullite and zirconia.

[5] The ceramic matrix composite according to any one of [1] to [4], wherein the ceramic matrix is one or more oxide selected from the group consisting of alumina, mullite and zirconia.

[6] The ceramic matrix composite according to any one of [1] to [5], wherein a tensile strength of the ceramic matrix composite is 150 MPa or more, and a ratio at which a strength of the ceramic matrix composite retains after the ceramic matrix composite has been subjected to a heat exposure treatment at 1200° C. for 100 hours is 80% or more.

[7] A method for producing the ceramic matrix composite according to any one of [1] to [6], the method comprising impregnating a continuous ceramic fiber with a ceramic matrix slurry prepared by adding a sintering inhibitor having a purity of 99% or more to a ceramic matrix raw-material powder, subsequently performing drying to prepare a green body, and sintering the green body.

[8] The method for producing the ceramic matrix composite according to [7], wherein the sintering inhibitor has an average particle size of more than 0.05 μm and 30 μm or less.

Advantageous Effects of Invention

The ceramic matrix composite according to the present invention achieves the above object, that is, provides at least one selected from a ceramic composite having a high tensile strength, that is, a tensile strength of 150 MPa or more, wherein a reduction in the strength of the ceramic composite which occurs when the ceramic composite is subjected to a heat exposure treatment is limited, that is, for example, a ceramic composite in which the strength reduction is limited such that the ratio at which the strength of the ceramic matrix composite retains after a heat exposure treatment has been performed at 1200° C. for 100 hours is 80% or more, and a method for producing the ceramic composite.

DESCRIPTION OF EMBODIMENTS

Figure 1:
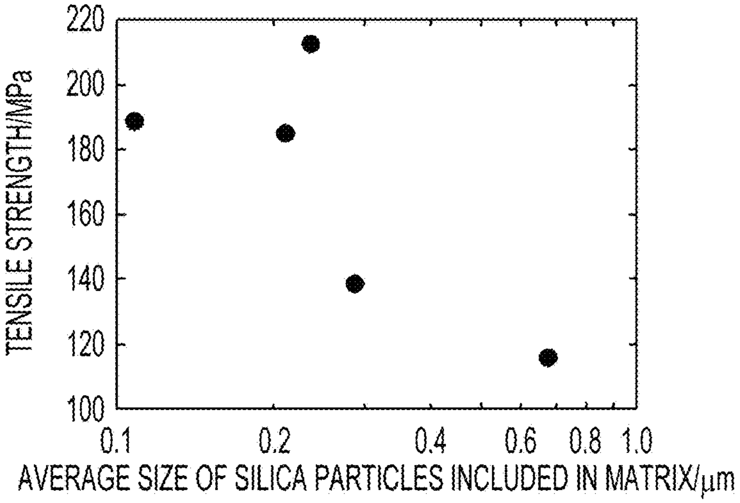
FIG. 1 is a graph illustrating the relationship of the tensile strengths of ceramic matrix composites prepared in Examples 1 to 3 and Comparative Examples 1 and 2 with respect to the average particle sizes of silica included in the respective ceramic matrices.
Figure 2:
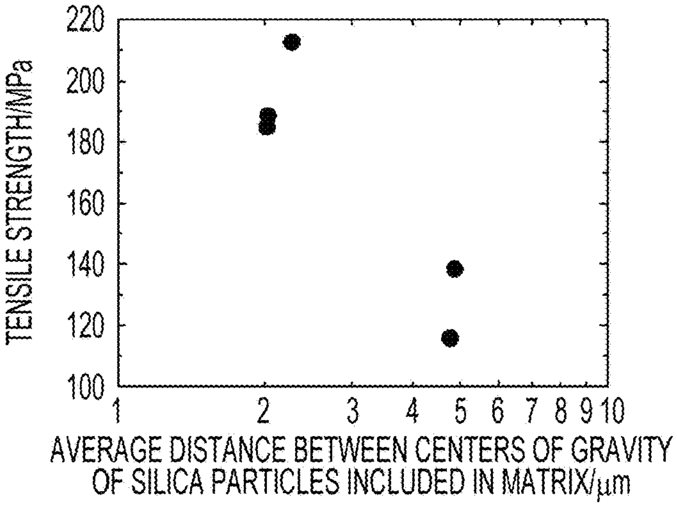
FIG. 2 is a graph illustrating the relationship of the tensile strengths of ceramic matrix composites prepared in Examples 1 to 3 and Comparative Examples 1 and 2 with respect to the average distances between the centers of gravity of silica particles included in the respective ceramic matrices.
Figure 3:
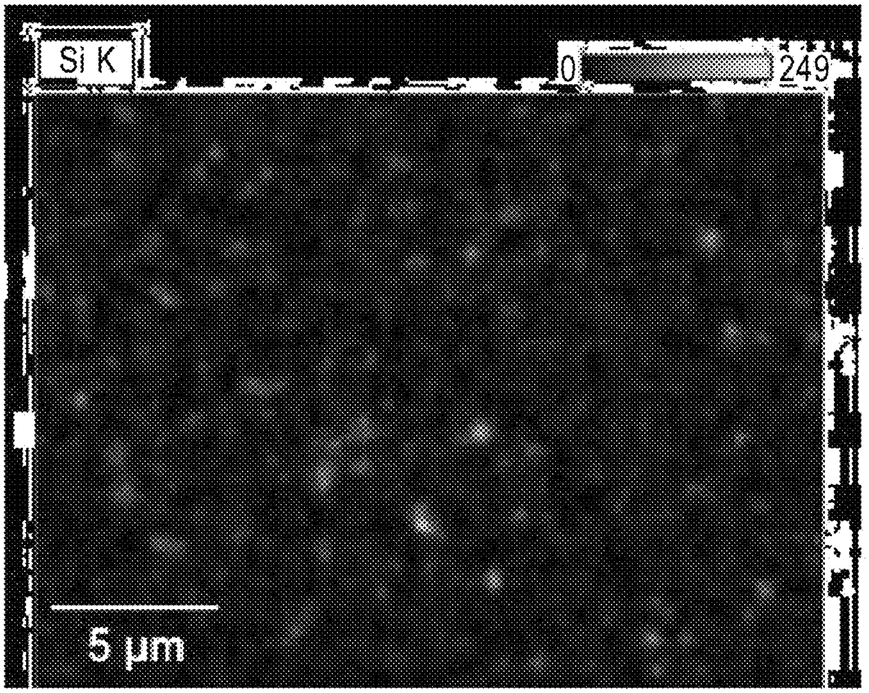
FIG. 3 is a silicon mapping image of a sample prepared in Example 1 taken at a 5000-fold magnification.
Figure 4:
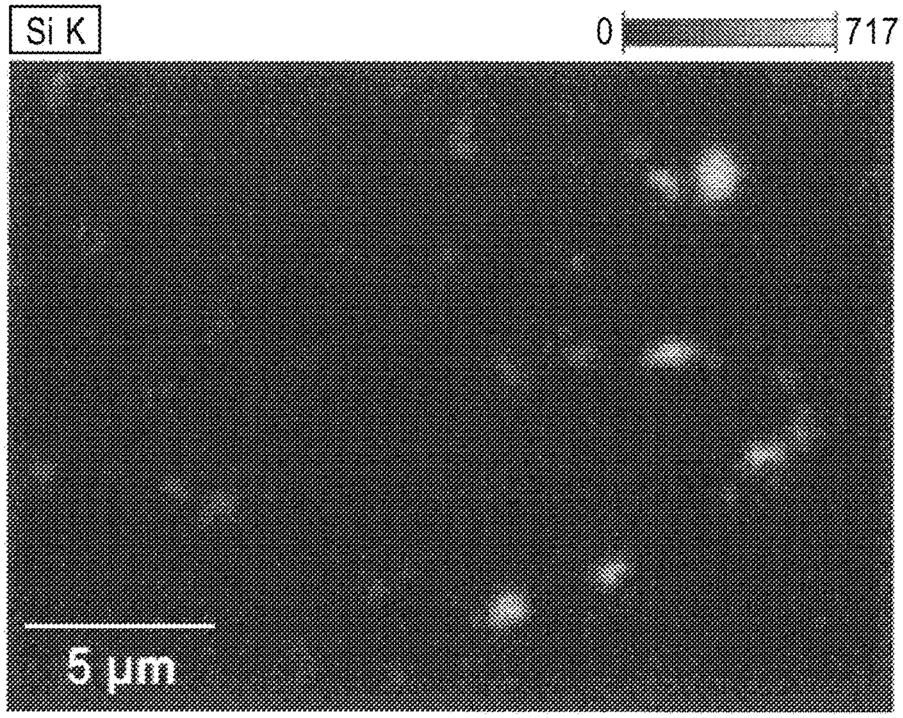
FIG. 4 is a silicon mapping image of a sample prepared in Comparative Example 1 taken at a 5000-fold magnification.

The present invention is described below.

In the present specification, the term "ceramic matrix composite" (CMC) refers to a material that is a composite of a continuous ceramic fiber and a ceramic matrix, that is, a "ceramic fiber-reinforced ceramic".

In the present specification, the term "ceramic fiber" refers to a polycrystalline ceramic yarn and a filamentous polycrystalline ceramic. Ceramic fibers are classified into "short ceramic fiber" and "continuous ceramic fiber" by fiber length. In this embodiment, the term "short ceramic fiber" refers to a ceramic fiber having a length of less than 500 μm, while the term "continuous ceramic fiber" refers to a ceramic fiber other than the short ceramic fiber (ceramic fiber having a length of 500 μm or more). The ceramic fiber may be one independent fiber, a ceramic fiber that is an assembly of a plurality of fibers, or a fiber bundle. In the present specification, the term "fiber bundle" refers to a fiber that is an assembly of two or more ceramic fibers. The fiber bundle may be a fiber that is an assembly of several hundred ceramic fibers. The term "ceramic fiber cloth" refers to a fabric made of a ceramic fiber and particularly to a fabric made of a continuous ceramic fiber. The ceramic fiber cloth may be a fabric made of a fiber bundle of continuous ceramic fibers.

In the present specification, the term "ceramic matrix" refers to a matrix (parent phase) of a CMC which is composed of ceramic crystal grains. The ceramic matrix may include a sintering inhibitor.

In the present specification, the term "sintering inhibitor" refers to a substance capable of suppressing the growth of ceramic crystal grains which occurs during a heat treatment.

The present invention relates to a CMC comprising a ceramic matrix (hereinafter, also referred to simply as "matrix") and a continuous ceramic fiber (hereinafter, also referred to simply as "continuous fiber"). The matrix includes a sintering inhibitor (hereinafter, also referred to as "inhibitor") having an average particle size of 0.28 μm or less. In other words, the CMC according to the present invention is a CMC composed essentially of the matrix, the continuous fiber and the inhibitor, and the inhibitor is included in the matrix. Furthermore, the matrix includes an inhibitor having a specific average particle size. If the average particle size of the inhibitor is larger than the above value, the inhibitor particles serve as coarse particles in the matrix and, consequently, may act as an origin of fracture of the CMC.

In the CMC according to the present invention, the average particle size of the inhibitor (hereinafter, also referred to as "average inhibitor particle size") is 0.28 μm or less. If the average inhibitor particle size is more than 0.28 μm, the tensile strength of the CMC is likely to reduce. The average inhibitor particle size is preferably 0.05 μm or more, 0.08 μm or more, or 0.10 μm or more and is preferably 0.28 μm or less or 0.26 μm or less. When the average inhibitor particle size is 0.05 μm or more, the growth of the matrix grains (i.e., the growth of ceramic crystal grains constituting the matrix) is likely to be suppressed.

The average inhibitor particle size is the average particle size of the inhibitor. In the CMC according to the present invention, the inhibitor is present inside the matrix. Therefore, the average inhibitor particle size is determined by observing the matrix with a field emission-scanning electron microscope (hereinafter, also referred to as "FE-SEM") equipped with an energy dispersive characteristic X-ray spectrometer in a cross section of the CMC to obtain EDS mapping data of the elements corresponding to the inhibitor, converting the data into a two-dimensional EDS mapping image, and analyzing the two-dimensional EDS mapping image.

The FE-SEM observation is conducted using a common field emission-scanning electron microscope equipped with an energy dispersive characteristic X-ray spectrometer (e.g., JSM-7600F produced by JEOL Ltd.). The FE-SEM observation is conducted under, for example, the following conditions.

Acceleration voltage: 7 kV

Observation magnification: 5000 fold

The measurement sample may be prepared by cutting the CMC with a diamond blade and forming an observation surface with an Ar beam cross section polisher.

The EDS mapping data may be converted into a two-dimensional EDS mapping image using image analysis software (e.g., ImageJ produced by The National Institutes of Health of The United States). Specifically, the EDS mapping data may be captured into image analysis software and converted into a two-dimensional EDS mapping image of 256×192 pixels.

The two-dimensional EDS mapping image may be analyzed using image analysis software (e.g., ImageJ produced by The National Institutes of Health of The United States). The two-dimensional EDS mapping image is captured into image analysis software on a gray scale. The gray scale image is binarized with 8-bit and a threshold of 50 to form a processed image. Since white regions of the processed image correspond to the inhibitor, the area-equivalent diameter of each of the white regions is calculated from the area of the white region in the processed image and the average of the area-equivalent diameters of the white regions is calculated as the average particle size of the inhibitor. The number of the inhibitor particles (white regions) used in the above calculation is 150±50.

In the CMC according to the present invention, the average distance of the centers of gravity of the inhibitor particles is preferably 4.5 μm or less, is more preferably 0.01 or more and 4.0 μm or less, and is further preferably 0.03 μm or more and 3.5 μm or less. When the average distance of the centers of gravity is 4.5 μm or less, the inhibitor particles are likely to be present in the matrix in a dispersed manner. In addition, defects resulting from the inhibitor are unlikely to be formed when the CMC is subjected to a heat exposure treatment.

The average distance of the centers of gravity is determined by analyzing a mapping image of the matrix (a two-dimensional EDS mapping image obtained by converting the EDS mapping data with image analysis software (e.g., ImageJ produced by The National Institutes of Health of The United States)) to obtain the centers of gravity of the inhibitor particles, connecting the centers of gravity to one another with a straight line in accordance with the criteria (a) and (b) below, and calculating the average of the lengths of the line segments.

(a) The centers of gravity are connected with one another with straight lines. Note that the straight lines do not pass through the other particles.

(b) When a line segment with which any two of the centers of gravity are connected to each other intersects another line segment, the shorter one is employed.

The average distance of the centers of gravity, which is determined by the above analysis, means the degree at which the inhibitor particles are away from one another in the matrix. The larger the average distance of the centers of gravity, the smaller the effect to inhibit the sintering of the matrix.

For deriving the average distance of the centers of gravity, image analysis software Nanohunter (product name: NS2K-PRO, produced by Nanosystem) may be used.

Specifically, in the present invention, the average distance of the centers of gravity may be determined by the following method: the matrix is observed with a FE-SEM in a cross section of the CMC in order to obtain an EDS mapping image of elements corresponding to the inhibitor, and the image is analyzed.

Using a processed image obtained by a method similar to that used in the measurement of the average inhibitor particle size, the coordinates of the center of gravity of each of the white regions included in the processed image are determined by the following method.

The coordinates of the center of gravity of a white region are defined as (Xg, Yg), and the coordinates of the center of gravity of each of the white regions are calculated using the following formula. The longer and shorter sides of the processed image are defined as X- and Y-axes, respectively.

$$Xg = (\text{Sum of } x\text{-coordinates of unit pixels into which the white region are divided})/\text{Sum of number of the unit pixels constituting the white region}$$

$$Yg = (\text{Sum of } y\text{-coordinates of unit pixels into which the white region are divided})/\text{Sum of number of the unit pixels constituting the white region}$$

The centers of gravity of the white regions are connected to one another with straight lines in accordance with the criteria (a) and (b) above. The average of the lengths of the line segments is calculated and used as the average distance of the centers of gravity.

For calculating the coordinates of the centers of gravity, the lengths of the line segments, and the average thereof, image analysis software (e.g., NS2K-PRO, produced by Nanosystem) may be used. The number of the inhibitor particles used for the calculation may be 150±50.

The inhibitor may have any composition different from that of the matrix. For example, the inhibitor is one or more selected from the group consisting of silica, zirconia, yttria, magnesia, mullite and strontium oxide. The inhibitor is preferably one or more selected from the group consisting of silica, zirconia, yttria, magnesia and mullite and is particularly preferably silica.

The content of the inhibitor (hereinafter, also referred to as "matrix inhibitor content") is preferably 1% by mass or more and 10% by mass or less, is more preferably 1.1% by mass or more and 9% by mass or less, and is further preferably 1.5% by mass or more and 6.5% by mass or less of the total mass of the matrix and the inhibitor. In order to reduce the likelihood of formation of defects resulting from the inhibitor, the matrix inhibitor content is preferably 0.3% by mass or more or 0.4% by mass or more and is preferably less than 5.0 mass or 4.0% by mass or less.

In the CMC according to the present invention, the ratio of the mass of the inhibitor to the mass of the CMC (hereinafter, also referred to as "CMC inhibitor content") is, for example, 0.4% by mass or more or 0.6% by mass or more and is, for example, 4.3% by mass or less or 2.8% by mass or less. In order to reduce the likelihood of formation of defects resulting from the inhibitor, the CMC inhibitor content is preferably 0.1% by mass or more or 0.2% by mass or more and is preferably 3.0% by mass or less or 2.5% by mass or less.

In the present invention, the mass of the CMC is the total mass of the matrix, the inhibitor and the continuous fiber.

For example, when the CMC includes silica serving as an inhibitor and alumina serving as a matrix, the CMC inhibitor content can be calculated as {(Mass [g] of silica)/(Mass of silica+Mass of alumina+Mass of continuous fiber)[g]}×100, and the matrix inhibitor content can be calculated as {(Mass [g] of silica)/(Mass of silica+Mass of alumina)[g]}×100.

The CMC according to the present invention preferably includes at least silica ($SiO_2$) serving as an inhibitor. When the CMC includes silica serving as an inhibitor, the growth of the matrix grains is readily suppressed and, consequently, a CMC having further high heat resistance is likely to be produced. In particular, when the matrix is alumina, the growth of the matrix grains can be further readily suppressed.

The content of silica (hereinafter, also referred to as "CMC silica content") is preferably 0.4% by mass or more or 0.6% by mass or more and is preferably 4.3% by mass or less or 2.8% by mass or less of the mass of the CMC. In order to readily reduce the formation of defects resulting from silica, the CMC silica content is preferably 0.1% by mass or more or 0.2% by mass or more and is preferably 3.0% by mass or less or 2.5% by mass or less. When the CMC silica content is 0.1% by mass or more, the growth of the matrix grains can be further readily suppressed. When the CMC silica content is 4.3% by mass or less, the fixation of the continuous ceramic fiber and the matrix to each other can be further reduced. Moreover, this reduces the likelihood of defects being formed in the CMC as a result of dissolution of silica when a heat exposure treatment is performed.

The matrix is at least one selected from an oxide ceramic and a non-oxide ceramic. The matrix is preferably an oxide ceramic, is more preferably one or more selected from the group consisting of alumina, mullite and zirconia, and is further preferably at least one selected from alumina and mullite.

In order to achieve high heat resistance and the like, the matrix is, for example, one or more oxides selected from the group consisting of alumina, mullite and zirconia. In order to achieve further high heat resistance and a further high strength, the matrix is preferably alumina.

The continuous fiber is not limited and may be any continuous fiber composed of a ceramic. The continuous fiber is preferably composed of an oxide ceramic, is further preferably composed of one or more selected from the group consisting of alumina, silica, mullite and zirconia, is further preferably composed of at least one oxide ceramic selected from alumina and mullite, and is further preferably composed of oxide ceramics that are alumina and/or mullite. The continuous ceramic fiber may be a continuous fiber composed of the same type of ceramic as the matrix or a continuous fiber composed of a different type of ceramic from the matrix. Note that the continuous fiber is a fiber that may have any length and that can be woven into a two- or three-dimensional structure. In the preparation of common CMCs, a fiber that is an assembly of several hundred fibers is used as a continuous ceramic fiber. The continuous ceramic fiber according to this embodiment is preferably at least one selected from a fiber bundle and a woven fiber bundle and is preferably a continuous ceramic fiber that is a woven fiber bundle (hereinafter, also referred to as "ceramic fiber cloth"). The oxide ceramic continuous fiber can be, for example, an alumina continuous fiber or a mullite continuous fiber and is more preferably a mullite continuous fiber. In consideration of strength, the continuous fiber is preferably an alumina continuous fiber. In consideration of heat resistance, the continuous fiber is preferably a mullite continuous fiber. Note that the mullite continuous fiber may be a continuous fiber composed of mullite and alumina and may include alumina. Examples of the continuous fiber composed of mullite and alumina include a continuous fiber in which the mass ratio between mullite ($3Al_2O_3 \cdot 2SiO_2$) and alumina ($Al_2O_3$) is 70%:30% by mass to 45%:55% by mass.

The CMC according to the present invention has a high strength. The tensile strength of the CMC (in particular, the tensile strength of the CMC that has not been subjected to a heat exposure treatment) is preferably 150 MPa or more, is further preferably 150 or more and 700 MPa or less, and is particularly preferably 150 or more and 650 MPa or less. Furthermore, the strength of the CMC according to the present invention does not reduce even when the CMC is exposed to a high-temperature environment of 1200° C. Therefore, the ratio at which the strength of the CMC according to the present invention is retained after the CMC has been subjected to a heat exposure treatment at 1200° C. for 100 hours (hereinafter, this ratio is also referred to simply as "strength retention") is preferably 80% or more, is more preferably 85% or more, and is further preferably 90% or more. The strength retention of the CMC according to the present invention is, for example, 120% or less, 115% or less, or 105% or less. The tensile strength of the CMC according to this embodiment that has been subjected to the heat exposure treatment may be higher than the tensile strength of the CMC that has not been subjected to the heat exposure treatment.

The above tensile strength is a value measured by a method conforming to JIS R 1656 using a strength tester (e.g., AG-XPlus, produced by Shimadzu Corporation) and a tensile test jig. In the preparation of a measurement sample, the CMC is worked into a piece having a width of 10±1 mm, a length of 110±10 mm and a thickness of 2±1 mm, and aluminum tabs are attached to the respective ends of the piece in order to prepare a tensile specimen. In the measurement of tensile strength, tensile strength is measured twice at a loading rate of 0.5 mm/min and the average thereof is used as the tensile strength of the CMC.

In the heat exposure treatment, for example, the CMC is subjected to a heat treatment at 1200° C. for 100 hours in an air atmosphere.

The fiber volume fraction of the CMC according to the present invention is, for example, 30 vol % or more and 60 vol % or less. When the fiber volume fraction falls within the above range, the continuous ceramic fiber is present in the CMC at an adequate degree and the shape of the CMC can be readily maintained. This makes it possible to readily produce a CMC having a high strength.

The fiber volume fraction is the volume fraction [vol %] of the continuous fiber in the CMC. The fiber volume fraction can be determined using the following formula.

$$\text{Fiber volume fraction[vol \%]} = (V_f/V_{CMC}) \times 100$$

In the above formula, $V_f$ represents the volume of the continuous fiber, and $V_{CMC}$ represents the volume of the CMC. $V_f$ and $V_{CMC}$ can be determined using the following formulae.

$$V_f = m/\rho_f$$

$$V_{cmc} = A \times B \times t$$

In the above formulae, m represents the mass [g] of the continuous fiber, $\rho_f$ represents the density [g/cm$^3$] of the continuous fiber, A represents the length [cm] of the CMC, B represents the width [cm] of the CMC, and t represents the thickness [cm] of the CMC.

The density of the CMC according to the present invention varies by, for example, the type of the matrix and is, for example, 2.40 g/cm$^3$ or more and 3.20 g/cm$^3$ or less.

The above density is the actual density [g/cm$^3$] of the CMC, which is the value determined by a method conforming to JIS R 1634 as the ratio [g/cm$^3$] of the volume measured by an Archimedes method to the mass measured using an electric balance.

The CMC according to this embodiment can be used in various CMC applications known in the related art. The CMC can be used as a member that includes a CMC, particularly in applications where certain heat resistance is required, and, furthermore, as one or more selected from the group consisting of a heat-resistant filter, a turbine member, and a nuclear power-related member.

A method for producing the CMC according to the present invention is described below.

The method for producing the CMC is not limited and may be any production method with which a CMC having the above-described features can be produced. The CMC according to the present invention can be produced by, for example, impregnating a continuous ceramic fiber with a ceramic matrix slurry prepared by adding a sintering inhibitor having a purity of 99% or more to a ceramic matrix raw-material powder, then performing drying to form a green body, and sintering the green body.

Specific examples of the method for producing the CMC according to the present invention include a method for producing a ceramic matrix composite, the method including a step of impregnating a continuous ceramic fiber with a slurry that includes a ceramic matrix raw-material powder, a sintering inhibitor having an average particle size of more than 0.05 μm and 30 μm or less, and a solvent to prepare a mixture, a step of solidifying the mixture to form a green body, and a step of sintering the green body. Examples of the method for producing the CMC according to the present invention include a method for producing a ceramic matrix composite, the method including a step of impregnating a continuous ceramic fiber with a slurry that includes a ceramic matrix raw-material powder, a sintering inhibitor having an average particle size of more than 0.05 μm and 30 μm or less and a purity of 99% or more, and a solvent to prepare a mixture, a step of solidifying the mixture to form a green body, and a step of sintering the green body.

In the step of impregnating a continuous ceramic fiber with a slurry that includes a ceramic matrix raw-material powder, a sintering inhibitor having an average particle size of more than 0.05 μm and 30 μm or less, and a solvent (hereinafter, also referred to as "impregnation step"), a composition including the continuous ceramic fiber (continuous fiber) and precursors of the matrix and the inhibitor which are diffused in the continuous fiber and with which the continuous fiber is moistened, that is, a mixture of the matrix slurry and the continuous fiber, is prepared.

The slurry including a ceramic matrix raw-material powder, a sintering inhibitor having an average particle size of more than 0.05 μm and 30 μm or less, and a solvent (hereinafter, this slurry is also referred to as "matrix slurry", and the sintering inhibitor included in the matrix slurry is also referred to as "inhibitor source" for the sake of simplicity) has certain flowability with which the continuous fiber can be impregnated with the slurry. The viscosity of the matrix slurry may be, for example, 1 mPa·s or more or 5 mPa·s or more and may be, for example, 500 mPa·s or less or 400 mPa·s or less. The viscosity of the matrix slurry is susceptible to the average particle size of the ceramic matrix raw-material powder, the average particle size of the inhibitor source, and the content of the inhibitor source. In some rare cases, the content of water adsorbed on the ceramic matrix raw-material powder and the inhibitor source affects the viscosity of the matrix slurry.

The ceramic matrix raw-material powder (hereinafter, also referred to simply as "raw-material powder") is a powder used as a raw material for the matrix of the CMC, that is, a precursor of the matrix. The raw-material powder may be selected appropriately in accordance with the type of the matrix of the intended CMC. The raw-material powder is, for example, an oxide powder. Specifically, the raw-material powder is one or more selected from the group consisting of an alumina powder, a mullite powder, a zirconia powder and a silica powder. More specifically, the raw-material powder is at least one selected from an alumina powder and a mullite powder. Further specifically, the raw-material powder is an alumina powder. Further specifically, the raw-material powder is an α-alumina powder, a mullite powder, a zirconia powder, or a composite powder thereof. The raw-material powder preferably includes at least an α-alumina powder and is preferably an α-alumina powder.

The average particle size of the raw-material powder (hereinafter, also referred to as "raw-material particle size") is preferably 0.1 μm or more and 5 μm or less, is more preferably 0.1 μm or more and 2.0 μm or less, and is further preferably 0.1 μm or more and 0.5 μm or less. When the raw-material particle size falls within the above range, the raw-material powder particles can be readily dispersed in the vicinity of the continuous fiber in a homogeneous manner.

The raw-material particle size is the median diameter (D50) of the raw-material powder in a volume particle size distribution of the raw-material powder which is determined by wet process. This can be measured using a common apparatus (e.g., MT3300EX-II, produced by MicrotracBEL). The measurement sample may be prepared by dispersing the raw-material powder in pure water to form a slurry and removing loose aggregates from the slurry by a dispersion treatment, such as an ultrasonic treatment.

The content of the raw-material powder in the matrix slurry (hereinafter, also referred to as "solid component concentration") is preferably 50% by mass or more and 80% by mass or less and is more preferably 60% by mass or more and 80% by mass or less.

The solid component concentration is a mass concentration calculated as the ratio [mass %] of the total mass of the raw-material powder and the inhibitor source to the total mass of the raw-material powder, the inhibitor source, and the solvent.

The ratio of the volume of the raw-material powder to the volume of the matrix slurry which is measured at 25° C. under atmospheric pressures (hereinafter, also referred to as "volume solid component concentration") is preferably 20 vol % or more and 55 vol % or less and is more preferably 28 vol % or more and 55 vol % or less.

For example, in the case where the matrix slurry includes an alumina powder serving as a raw-material powder, silica serving as an inhibitor source, and water serving as a solvent, the solid component concentration is calculated as {(Mass [g] of alumina powder+Mass [g] of silica)/(Mass of silica+Mass of alumina powder+Mass of water) [g]}×100, and the volume solid component concentration is calculated as {(Volume [$cm^3$] of alumina+Volume [$cm^3$] of silica)/(Volume of silica+Volume of alumina+Volume of water) [$cm^3$ ]}×100. In the calculation of the volume solid component concentration, densities at 25° C. under atmospheric pressures may be used.

The solid component concentration can also be calculated as the ratio of the mass of the substance that remains after the solvent has been removed from the matrix slurry by drying to the mass of the matrix slurry.

The inhibitor source may be at least any one of the same compound as the inhibitor included in the CMC and a precursor of the compound. The inhibitor source may be a precursor of the inhibitor included in the CMC. The inhibitor source may be any compound having a different composition from the raw-material powder. The inhibitor source may be, for example, one or more selected from the group consisting of silica, zirconia, yttria, magnesia and mullite. Specifically, the inhibitor source may be, for example, one or more selected from the group consisting of silica, zirconia, yttria, magnesia and mullite. More specifically, the inhibitor source may be, for example, at least any one of silica and zirconia. It is preferable that the inhibitor source include at least silica. It is more preferable that the inhibitor source be silica.

The inhibitor source may be in any state in which it is miscible with the raw-material powder. The inhibitor source particles are preferably at least any one of powder particles and colloidal particles and are more preferably powder particles.

The average particle size of the inhibitor source (hereinafter, also referred to as "average inhibitor source particle size") is preferably more than 0.05 μm and 30 μm or less. The average inhibitor source particle size is 30 μm or less and is preferably 10 μm or less, 5 μm or less, 1 μm or less, 0.8 μm or less, or 0.5 μm or less. If the average inhibitor source particle size is more than 30 μm, coarse particles of the inhibitor are likely to be formed in the CMC. The average inhibitor source particle size is 0.01 μm or more and is preferably 0.05 μm or more, 0.08 μm or more, 0.1 μm or more, or 0.2 μm or more. The preferable range of the average inhibitor source particle size is, for example, 0.06 μm or more and 10 μm or less, is specifically 0.06 or more and 1 μm or less, and is more specifically 0.08 μm or more and 0.5 μm or less. When the average inhibitor agent particle size falls within the above range, the aggregation of the inhibitor source particles in the matrix slurry can be reduced. Moreover, the inhibitor particles can be readily dispersed in the matrix of the CMC in a homogeneous manner. It is considered that, consequently, the average inhibitor particle size of the CMC according to the present invention can be readily achieved after sintering.

The average inhibitor source particle size may be measured as in the measurement of the raw-material particle size.

The purity of the inhibitor source is preferably maximized and is preferably 99% or more. The purity may be 100% or less or less than 100%.

The content of the inhibitor source in the matrix slurry is not limited and may be substantially equal to the content of the inhibitor in the intended CMC. As for the content of the inhibitor source in the matrix slurry, for example, the ratio of the mass of the inhibitor source to the total mass of the raw-material powder and the inhibitor source (hereinafter, also referred to as "inhibitor source content"; in the case where the inhibitor is silica or the like, also referred to as "silica source content" or the like) is preferably 0.3% by mass or more and 10% by mass or less, is more preferably 0.4% by mass or more and 9% by mass or less, and is further preferably 0.5% by mass or more and 7% by mass or less.

The ratio of the mass of the inhibitor source to the mass of the matrix slurry (i.e., the total mass of the raw-material powder, the inhibitor source and the solvent) (hereinafter, this ratio is also referred to as "inhibitor source content (slurry)") is, for example, 0.2% by mass or more or 0.3% by mass or more and is, for example, 8% by mass or less or 7% by mass or less.

For example, in the case where the matrix slurry includes alumina serving as a matrix powder, silica serving as an inhibitor source, and water serving as a solvent, the inhibitor source content can be calculated as {(Mass of silica [g])/(Mass of silica+Mass of alumina)[g]}×100, and the inhibitor source content (slurry) can be calculated as {(Mass of silica [g])/(Mass of silica+Mass of alumina+Mass of water)[g]}×100.

The ratio of the mass of the raw-material powder to the mass of the matrix slurry (i.e., the total mass of the raw-material powder, the inhibitor source and the solvent) (hereinafter, this ratio is also referred to as "raw-material powder content (slurry)") is, for example, 45% by mass or more or 55% by mass or more and is, for example, 80% by mass or less or 75% by mass or less.

For example, in the case where the matrix slurry includes alumina serving as a matrix powder, silica serving as an inhibitor source, and water serving as a solvent, the raw-material powder content (slurry) can be calculated as {(Mass of alumina [g])/(Mass of silica+Mass of alumina+Mass of water)[g]}×100.

Examples of the solvent included in the matrix slurry include water; one or more alcohols selected from the group consisting of methanol, ethanol, 1-propanol, 2-propanol, 1-butanol, 2-butanol, butyl alcohol and isobutyl alcohol; one or more ketones selected from the group consisting of acetone, methyl ethyl ketone, methyl isobutyl ketone, diisobutyl ketone, cyclohexanone and diacetone alcohol; one or more aromatic hydrocarbons selected from the group consisting of benzene, toluene and xylene; one or more esters selected from the group consisting of ethyl acetate, methyl acetate, butyl acetate, methoxybutyl acetate and isobutyl acetate; one or more aliphatic hydrocarbons selected from the group consisting of n-hexane, heptane, cyclohexane and methylcyclohexane; one or more glycol ethers selected from the group consisting of ethylene glycol, ethylene glycol monomethyl ether, ethylene glycol monoethyl ether, ethylene glycol monobutyl ether and propylene glycol monomethyl ether; and one or more selected from the group consisting of N,N-dimethylformamide, tetrahydrofuran, N-methyl-2-pyrrolidone, 1,4-dioxane and styrene. The solvent is preferably at least any one of water and alcohol and is further preferably water.

In the production method according to the present invention, the method for producing the matrix slurry used in the impregnation step is not limited and may be any production method with which a slurry that includes the raw-material powder and the inhibitor source which are dispersed therein can be prepared. The method for producing the matrix slurry is not limited and may be any method with which the raw-material powder, the inhibitor source and the solvent can be mixed with one another. The matrix slurry is preferably produced by grind mixing. Specifically, for example, the raw-material powder, the inhibitor source and the solvent are mixed with one another, and the resulting mixture is ground with a ball mill. The balls included in the ball mill are not limited and may be any balls with which loose aggregates included in the raw-material powder can be removed. Ceramic balls larger than the average particle size of the raw-material powder or the like may be used. Examples of such balls include ceramic balls having a diameter of 0.5 mm or more and 20 mm or less and ceramic balls having a diameter of 1 mm or more and 15 mm or less. The ceramic balls may be at least any one of alumina balls and zirconia balls and are specifically alumina balls.

The matrix slurry may include a dispersant in order to disperse the raw-material powder and the inhibitor source in the solvent in a further homogeneous manner. The dispersant is, for example, at least any one of a dispersant having a high affinity for the raw-material powder and a dispersant highly soluble in the solvent. Examples of the dispersant include one or more selected from the group consisting of an anionic high-molecular-weight dispersant, a cationic high-molecular-weight dispersant, a nonionic high-molecular-weight dispersant, an anionic low-molecular-weight dispersant, a cationic low-molecular-weight dispersant, a nonionic low-molecular-weight dispersant, an inorganic acid and an inorganic salt. Specifically, the dispersant is preferably one or more selected from the group consisting of ammonium polyacrylate, ammonium polymethacrylate, sodium polyacrylate, sodium polymethacrylate, polyethyleneimine, polyethylene glycol, sodium dodecylsulfonate, sodium dodecylbenzenesulfonate, benzalkonium chloride, distearyl dimethyl ammonium chloride, polyoxyethylene alkyl ether, pentaethylene glycol monododecyl ether, octaethylene glycol monododecyl ether, polyoxyethylene alkyl phenyl ether, dilute nitric acid, dilute hydrochloric acid, dilute sulfuric acid, phosphoric acid and sodium tripolyphosphate. The dispersant is more preferably one or more selected from the group consisting of ammonium polyacrylate, ammonium polymethacrylate, sodium polyacrylate, sodium polymethacrylate, polyethyleneimine, dilute nitric acid, dilute hydrochloric acid, dilute sulfuric acid and phosphoric acid. The dispersant is further preferably one or more selected from the group consisting of ammonium polyacrylate, ammonium polymethacrylate, dilute nitric acid and dilute hydrochloric acid. The dispersant is still further preferably at least any one of dilute nitric acid and dilute hydrochloric acid.

The content of the dispersant is, for example, 0.01% by mass or more or 0.05% by mass or more and is, for example, 10% by mass or less or 8% by mass or less of the mass of the matrix slurry (i.e., the total mass of the raw-material powder, the inhibitor source, the solvent and the dispersant).

Examples of the continuous ceramic fiber impregnated with the matrix slurry include an alumina continuous fiber and a mullite continuous fiber. An alumina-mullite continuous fiber, that is, a continuous fiber composed of alumina and mullite, is preferable.

The continuous ceramic fiber used in the impregnation step may be the same as the continuous ceramic fiber included in the CMC. The continuous ceramic fiber is preferably a continuous fiber composed of one or more selected from the group consisting of alumina, silica, mullite and zirconia and is more preferably a continuous fiber composed of at least any one of alumina and mullite.

A mixture of the matrix slurry and the continuous fiber is produced in the impregnation step. The impregnation method may be any method with which the matrix slurry can be diffused in the continuous fiber and the continuous fiber can be moistened with the matrix slurry. The impregnation method may be, for example, at least any one of vacuum impregnation and pressure impregnation.

Vacuum impregnation is, for example, a treatment performed under the following conditions.

Impregnation atmosphere: Degree of vacuum is
85% or more or 90% or more, and
100% or less, less than 100%, or 99% or less
Impregnation temperature:
0° C. or more or 10° C. or more, and
40° C. or less or 35° C. or less Pressure impregnation is, for example, a treatment performed under the following conditions.

Impregnation pressure:
0.11 MPa or more or 0.15 MPa or more, and
2.0 MPa or less or 1.8 MPa or less
Impregnation temperature:
0° C. or more or 10° C. or more, and
40° C. or less or 35° C. or less A specific example of the impregnation method is a method of impregnating the continuous fiber with the matrix slurry in a vacuum having a degree of vacuum of 95% or more and less than 100% at 25° C.

The production method according to this embodiment includes a step of solidifying the mixture to form a green body (hereinafter, also referred to as "forming step"). In this step, a green body that is a precursor of the CMC according to this embodiment is produced. The forming method may be any method with which the mixture can be solidified to form a mixture (green body) having a certain shape. The forming method may be, for example, one or more selected from the group consisting of a heat treatment, a freezing treatment, and an additive treatment. The forming step may be conducted using the above methods in combination with one another. In the forming step, similar treatments may be performed a plurality of times.

The heat treatment is, for example, a treatment performed under the following conditions.

Temperature at which heat treatment is performed:
50° C. or more, 60° C. or more, or 80° C. or more, and
160° C. or less or 140° C. or less
Number of times heat treatment is performed:
One to five The amount of time during which the heat treatment is performed may be adjusted appropriately in accordance with the amount of the mixture subjected to the treatment and the temperature at which the heat treatment is performed. The amount of time during which the heat treatment is performed is, for example, 1 hour or more and 10 hours or less and, specifically, 2 hours or more and 8 hours or less.

The freezing treatment is, for example, a treatment performed under the following conditions.

Freezing temperature:
−200° C. or more or −180° C. or more, and
−20° C. or less or −30° C. or less
Sublimation pressure:
0.001 MPa or more or 0.002 MPa or more, and
0.05 MPa or less or 0.03 MPa or less
Number of times the treatment is performed:
One to five In the case where the freezing treatment is performed a plurality of times, the freezing temperature and the sublimation pressure may be set appropriately.

The additive treatment is, for example, a treatment in which the mixture is mixed with additives, such as a solidifying agent and a binder, in order to form the mixture into a predetermined shape. Known additives commonly used in the production of CMCs may be used. The additives are, for example, one or more selected from the group consisting of agar, gelatin, methyl cellulose, camphene, sodium alginate, 2-hydroxyethyl acrylate, 4-hydroxybutyl acrylate, 6-hydroxyhexyl acrylate, acrylic acid, methacrylic acid, acrylamide, N,N'-methylenebisacrylamide, N,N'-ethylenebisacrylamide methacrylamide, polyethylene glycol diacrylate, methyl acrylate, methyl methacrylate, ethyl acrylate, ethyl methacrylate, butyl acrylate, urea, boron nitride (BN), aluminum nitride (AlN), silicon nitride (Si3N4), gallium nitride (GaN), zirconium nitride (ZrN), polyaluminum chloride ($[Al_2(OH)_nCl_{6-n}]_m$, 1≤n≤5, m≤10), trimethoxyaluminum, triethoxyaluminum, tri-n-propoxyaluminum, tri-i-propoxyaluminum, tri-n-butoxyaluminum, tri-i-butoxyaluminum, tri-sec-butoxyaluminum, tri-t-butoxyaluminum, trimethoxyboron, triethoxyboron, tri-n-propoxyboron, tri-i-propoxyboron, tetramethoxysilane, tetraethoxysilane, tetra-n-propoxysilane, tetra-i-propoxysilane, tetra-n-butoxysilane, tetra-i-butoxysilane, tetra-n-butoxysilane, tetra-sec-butoxysilane, tetra-t-butoxysilane, methyltrimethoxysilane, ethyltrimethoxysilane, propyltrimethoxysilane, methyltriethoxysilane, ethyltriethoxysilane, propyltrimethoxysilane, propyltriethoxysilane, a paraffin wax and polyvinyl alcohol.

The additive treatment is preferably performed by one or more selected from the group consisting of a method of mixing a solidifying agent and a binder with the mixture, a method of mixing a solidifying agent with the mixture, and a method of mixing a binder with the mixture. The method of mixing a solidifying agent and a binder with the mixture is more preferable.

In the production method according to this embodiment, the above mixing and forming steps may be repeated. The production method according to this embodiment may include a mixing step conducted under the same conditions as the above mixing step except that the green body prepared in the forming step is used instead of the continuous ceramic fiber. For example, the production method according to this embodiment includes one to five cycles of the mixing and forming steps.

The method for producing the CMC according to the present invention includes a step of sintering the green body (hereinafter, also referred to as "sintering step"). The CMC according to the present invention is produced in the above step. The sintering may be performed under any conditions with which sintering of the raw-material powder occurs. For example, the sintering may be performed under the following conditions.

Sintering atmosphere:

Oxidizing atmosphere or inert atmosphere, preferably air atmosphere

Sintering temperature:

800° C. or more, 900° C. or more, or 1000° C. or more, and

1600° C. or less or 1500° C. or less

Number of times firing is performed:

One to five

The amount of time during which the firing is performed may be changed appropriately in accordance with the size of the green body (or calcined body) and the properties of the firing furnace used. The above firing time is, for example, 30 minutes or more and 120 hours or less. In the case where the firing is performed a plurality of times, the firing atmosphere and the firing temperature may be set appropriately.

The sintering is preferably normal pressure sintering for the sake of simplicity of operation. In the present invention, the term "normal pressure sintering" refers to a method of sintering a material (such as a green body or a calcined body) by heat without applying any external forces to the material during sintering.

It is preferable that, in the sintering step, the green body be sintered at 800° C. or more and preferably at 800° C. or more and less than 1000° C. in an air atmosphere under atmospheric pressures to form a calcined body and the calcined body be sintered at 900° C. or more and 1600° C. or less, preferably at 1000° C. or more and 1600° C. or less, and more preferably at 1000° C. or more and 1500° C. or less in an air atmosphere under atmospheric pressures.

Another example of the preferable sintering step is a step of sintering the green body at 800° C. or more and less than 1000° C. to prepare a calcined body, sintering the calcined body at 1000° C. or more and less than 1150° C. to prepare a primary sintered body, and sintering the primary sintered body at 1150° C. or more and 1500° C. or less. This step enables a further dense CMC to be readily produced. As for the conditions under which sintering is performed in the sintering step, for example, the sintering method is normal pressure sintering and the sintering atmosphere is an oxidizing atmosphere and is preferably an air atmosphere.

EXAMPLES

The present invention is described with reference to Examples below. It should be noted that the present invention is not limited by Examples below.

(Heat Exposure Treatment)

A sintered CMC was held in an electric furnace (under atmospheric pressures, in air atmosphere) at 1200° C. for 100 hours and subsequently cooled to room temperature.

(Tensile Test)

A sintered CMC or a CMC that had been subjected to the heat exposure treatment was cut to a piece having a width of 10±1 mm, a length of 110 mm or more or 110±10 mm, and a thickness of 2±1 mm with a diamond cutter to prepare a specimen conforming to JIS R 1656. Aluminum tabs with a tilt angle of 14 degrees were bonded onto both surfaces of the respective ends of the specimen with an epoxy adhesive.

Hereby, a specimen was prepared. The specimen was subjected to a tensile test at a loading rate of 0.5 mm/min with a universal testing machine (Machine name: AG-XPlus, produced by Shimadzu Corporation) and a tensile test jig. The tensile strength of the CMC was calculated using the cross-sectional area of the specimen, which was calculated from the thickness and width of the specimen with a micrometer, and the maximum strength of the specimen at rupture.

(Calculation of Strength Retention)

The strength retention was calculated by dividing the tensile strength of a CMC that had been subjected to the heat exposure treatment by the tensile strength of the CMC that had not been subjected to the heat exposure treatment and converting the quotient to a percentage.

(Calculation of Average Inhibitor Particle Size)

A CMC was cut to a 5 mm-square tabular sample with a diamond cutter. A cross section of the sample was subjected to an argon beam cross section polisher to form an observation cross section. The observation cross section was observed with a field emission-scanning electron microscope equipped with an energy dispersive characteristic X-ray spectrometer (apparatus name: JSM-7600F, produced by JEOL Ltd.) in order to obtain an EDS mapping data of silicon (sintering inhibitor) included in the matrix at a 5000-fold magnification. The above data were converted to a two-dimensional EDS mapping image using image analysis software (software name: ImageJ, produced by The National Institutes of Health of The United States). The mapping image (two-dimensional EDS mapping image) was binarized using image analysis software ImageJ with 8-bit and a threshold of 50 to form a processed image. The average inhibitor particle size of the silicon (sintering inhibitor) was calculated from the areas of white regions on the basis of the processed image.

(Calculation of Average Distance of Centers of Gravity)

Using a processed image obtained by a method similar to that used in the calculation of the average inhibitor particle size, the coordinates of the center of gravity of each of the white regions, which corresponded to sintering inhibitor particles, included in the image were determined by the following method.

The coordinates of the center of gravity of a white region were defined as (Xg, Yg), and the coordinates of the center of gravity of each of the white regions were calculated using the following formula. The longer and shorter sides of the processed image were defined as X- and Y-axes, respectively.

$$Xg = \text{(Sum of } x\text{-coordinates of unit pixels into which the white region were divided)/Sum of number of the unit pixels constituting the white region}$$

$$Yg = \text{(Sum of } y\text{-coordinates of unit pixels into which the white region were divided)/Sum of number of the unit pixels constituting the white region}$$

The centers of gravity of the white regions were connected to one another with straight lines in accordance with the criteria (a) and (b) below. The average of the lengths of the line segments was calculated.

(a) The centers of gravity were connected with one another with straight lines such that the straight lines did not pass through the other white regions.

(b) When a straight line with which any two of the centers of gravity were connected to each other intersected another straight line with which other two of the centers of gravity were connected to each other, the shorter one is employed.

For calculating the coordinates of the centers of gravity, the lengths of the line segments, and the average thereof, image analysis software (software name: NS2K-PRO, produced by Nanosystem) was used. The number of the sintering inhibitor particles used for the calculation was 150±50.

(Raw-Material Particle Size and Average Inhibitor Source Particle Size)

The raw-material particle size and the average inhibitor source particle size were measured using a laser diffraction-scattering particle size distribution analyzer (apparatus name: MT3300EX-II, produced by MicrotracBEL) by a method conforming to JIS R 1629. The measurement conditions are described below.

| | |
|---|---|
| Light source | Semiconductor laser |
| Voltage | 780 mW |
| Measurement sample | Slurry prepared by |

dispersing the raw-material powder in pure water

| | |
|---|---|
| Alumina refractive index | 1.77 |
| Zirconia refractive index | 2.17 |
| Silica refractive index | 1.48 |
| Solvent (water) refractive index | 1.333 |
| Calculation mode | MT3000EXII |

As a pretreatment, the sample powder and 0.2% by mass of ammonium polyacrylate dispersant were suspended in pure water to form a slurry, which was subjected to a dispersion treatment for 3 minutes with a ultrasonic homogenizer (apparatus name: BRANSON SONIFIER 250, produced by Emerson Electric Co.).

(Fiber Volume Fraction)

The fiber volume fraction was calculated from the mass of the continuous ceramic fiber, the density of the continuous ceramic fiber, and the volume of the CMC using the following formula.

$$\text{Fiber volume fraction [vol \%]}=(V_f/V_{CMC})100$$

$$V_f=m/\rho_f$$

$$V_{CMC}=A\times B\times t$$

In the above formula, $V_f$ represents the volume of the continuous ceramic fiber, $V_{CMC}$ represents the volume of the CMC, m represents the mass [g] of the continuous ceramic fiber, $\rho_f$ represents the density [g/cm$^3$] of the continuous ceramic fiber, A represents the length [cm] of the CMC, B represents the width [cm] of the CMC, and t represents the thickness [cm] of the CMC.

(Density)

The density was determined by the method conforming to JIS R 1634 as the ratio (g/cm$^3$) of the volume measured by an Archimedes method to the mass measured using an electric balance. Prior to the measurement, after the mass of the dried CMC had been measured, the CMC was placed in water and boiled for 3 hours as a pretreatment.

Example 1

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica raw material (silica powder) having an average particle size (inhibitor particle size) of 0.10 μm, and 125 g (25.0% by mass of the mass of the matrix slurry) of pure water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 40.6 cP was prepared.

A commercial mullite continuous fiber cloth, (i.e., continuous fiber cloth composed of mullite and alumina) (Nextel-720 produced by 3M Company) was subjected to a heat treatment (desizing treatment) at 800° C. in air. The mullite continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 2.0 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 45 vol % and a tensile strength of 189 MPa. The tensile strength of the CMC that had been subjected to the heat exposure treatment was 175 MPa, and the strength retention was 93%. The average particle size of silica included in the matrix (average inhibitor particle size) was 0.11 μm (0.108 μm). The average distance of the centers of gravity was 2.0 μm.

Example 2

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica raw material (silica powder) having an average particle size (inhibitor particle size) of 0.24 μm, and 125 g (25.0% by mass of the mass of the matrix slurry) of pure water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 36.9 cP was prepared.

A commercial mullite continuous fiber cloth, (i.e., continuous fiber cloth composed of mullite and alumina) (Nextel-720 produced by 3M Company) was subjected to a heat treatment (desizing treatment) at 800° C. in air. The mullite continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 2.1 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 43 vol % and a tensile strength of 189 MPa. The tensile strength of the CMC that had been subjected to the heat exposure treatment was 198 MPa, and the strength retention was 105%. The average particle size of silica included in the matrix (average inhibitor particle size) was 0.21 μm (0.211 μm). The average distance of the centers of gravity was 2.0 μm.

Example 3

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica raw material (silica powder) having a purity of 99.9% and an average particle size (inhibitor particle size) of 0.24 μm, and 125 g (25.0% by mass of the mass of the matrix slurry) of water were mixed with one another. The resulting mixture was mixed with 1.2 kg of alumina balls having a diameter of 10 mm and subjected to ball milling for 24 hours. Hereby, a ceramic matrix slurry having a volume solid component concentration of 43 vol % (solid component concentration: 75% by mass) and a viscosity of 50.6 cP was prepared.

A commercial alumina continuous fiber cloth (Nextel-610 produced by 3M Company) was subjected to a heat treatment (desizing treatment) at 800° C. in air. The alumina continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 1.9 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC included a fiber having a fiber volume fraction of 43 vol % and had a tensile strength of 221 MPa. The tensile strength of the CMC that had been subjected to the heat exposure treatment was 192 MPa, and the strength retention was 87%. The average particle size of silica included in the matrix (average inhibitor particle size) was 0.22 μm (0.221 μm). The average distance of the centers of gravity was 2.3 μm.

Example 4

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica powder having a purity of 99.9% and an average particle size (inhibitor particle size) of 0.10 μm, and 125 g (25.0% by mass of the mass of the matrix slurry) of water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 28.6 cP was prepared.

A commercial alumina continuous fiber cloth (Nextel-610 produced by 3M Company) was subjected to a heat treatment (desizing treatment) at 800° C. in air. The alumina continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 1.8 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 41 vol % and a tensile strength of 211 MPa. The tensile strength of the CMC that had been subjected to the heat exposure treatment was 207 MPa, and the strength retention was 98%. The average inhibitor particle size was 0.15 μm (0.151 μm). The average distance of the centers of gravity was 2.7 μm.

Example 5

358 g (raw-material powder content (slurry): 71.6% by mass) of an α-alumina powder having an average particle size (raw-material particle size) of 0.15 μm, 11.3 g (inhibitor source content (slurry): 3.4% by mass, inhibitor source content: 4.8% by mass)) of a silica powder having a purity of 99.9% and an average particle size (inhibitor particle size) of 0.24 μm, and 125 g (25.0% by mass of the mass of the matrix slurry) of water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 48.9 cP was prepared.

A commercial alumina continuous fiber cloth (Nextel-610 produced by 3M Company) was subjected to a heat treatment (desizing treatment) at 800° C. in air. The alumina continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 1.9 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 39 vol % and a tensile strength of 189 MPa. The tensile strength of the CMC that had been subjected to the heat exposure treatment was 189 MPa, and the strength retention was 100%. The average inhibitor particle size was 0.22 μm (0.219 μm). The average distance of the centers of gravity was 1.8 μm.

Example 6

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica powder having a purity of 99.9% and an average particle size (inhibitor particle size) of 2.4 μm, and 125 g (25.0% by mass of the mass of the matrix slurry) of water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 58.1 cP was prepared.

A commercial alumina continuous fiber cloth (Nextel-610 produced by 3M Company) was subjected to a heat treatment (desizing treatment) at 800° C. in air. The alumina continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 1.9 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 41 vol % and a tensile strength of 222 MPa. The tensile strength of the CMC that had been subjected to the heat exposure treatment was 211 MPa, and the strength retention was 95%. The average inhibitor particle size was 0.17 μm (0.166 μm). The average distance of the centers of gravity was 2.4 μm.

Example 7

371 g (raw-material powder content (slurry): 74.3% by mass) of an α-alumina powder having an average particle size (raw-material particle size) of 0.15 μm, 3.8 g (inhibitor source content (slurry): 0.75% by mass, inhibitor source content: 1.0% by mass)) of a silica powder having a purity of 99.9% and an average particle size (inhibitor particle size) of 0.24 μm, and 125 g (25.0% by mass of the mass of the matrix slurry) of water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 50.6 cP was prepared.

A commercial mullite continuous fiber cloth (i.e., continuous fiber cloth composed of mullite and alumina) (Nextel-720 produced by 3M Company) was subjected to a heat treatment (desizing treatment) at 800° C. in air. The mullite continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of 2.1 mm was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 42 vol % and a tensile strength of 180 MPa. The tensile strength of the CMC that had been subjected to the heat exposure treatment was 181 MPa, and the strength retention was 100%. The average inhibitor particle size was 0.11 μm (0.109 μm). The average distance of the centers of gravity was 2.2 μm.

The CMC prepared in Example 7 was held at 1200° C. for 1000 hours in an air atmosphere and subsequently cooled to room temperature. The tensile strength of the CMC that had been subjected to the above treatment was 153 MPa. The ratio of the tensile strength of the CMC that had been subjected to the above treatment to the tensile strength of the CMC that had not been subjected to the above treatment was 85%.

Comparative Example 1

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica powder having a purity of 99.9% and an average particle size (inhibitor particle size) of 0.05 μm, and 125 g (25.0% by mass of the mass of the matrix slurry) of pure water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 21.6 cP was prepared.

A commercial mullite continuous fiber cloth (i.e., continuous fiber cloth composed of mullite and alumina) (Nextel-720 produced by 3M Company) was subjected to a heat treatment (desizing treatment) at 800° C. in air. The mullite continuous fiber cloth that had been subjected to the desizing treatment was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 2.4 mm) was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 39 vol % and a tensile strength of 132 MPa. The tensile strength of the CMC that had been subjected to the heat exposure treatment was 151 MPa, and the strength retention was 109%. The average particle size of silica included in the ceramic matrix (average inhibitor particle size) was 0.29 μm (0.287 μm). The average distance of the centers of gravity was 4.9 μm. The average particle size of the silica powder included in the matrix (average inhibitor particle size) was larger than the average particle size of the silica powder used as a raw material. This is presumably because the silica powder particles aggregated with one another in the matrix slurry to form coarse particles. It is considered that, since the average distance of the centers of gravity was large, the effect of the sintering inhibitor included in the CMC prepared in Comparative Example 1 to suppress the sintering of alumina was poor, that is, the effect to suppress the growth of alumina crystal grains constituting the matrix was poor, and the CMC prepared in Comparative Example 1 had a low tensile strength consequently.

Comparative Example 2

363 g (raw-material powder content (slurry): 72.8% by mass) of an α-alumina powder having an average particle size (raw-material particle size) of 0.15 μm, 11.3 g (inhibitor source content (slurry): 2.2% by mass, inhibitor source content: 3.1% by mass)) of a silica raw material (silica powder) having a purity of 99.9% and an average particle size (inhibitor particle size) of 38 μm, and 125 g (25.0% by mass of the mass of the matrix slurry) of pure water were mixed with one another. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 52.3 cP was prepared.

A commercial mullite continuous fiber cloth (i.e., continuous fiber cloth composed of mullite and alumina) (Nextel-720 produced by 3M Company) was subjected to a heat treatment (desizing treatment) at 800° C. in air. The resulting continuous fiber cloth was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of about 2 mm (thickness: 2.4 mm) was prepared. The green body was sintered at 900° C. under normal pressure in air to form a calcined body. The calcined body was sintered at 1100° C. in air and subsequently subjected to a heat treatment (sintering) at 1200° C. in air to form a CMC. The CMC had a fiber volume fraction of 41 vol % and a tensile strength of 115 MPa. The tensile strength of the CMC that had been subjected to the heat exposure treatment was 113 MPa, and the strength retention was 98%. The average particle size of silica included in the matrix (average inhibitor particle size) was 0.68 μm (0.675 μm). The average distance of the centers of gravity was 4.8 μm.

The average particle size of the silica powder included in the ceramic matrix (average inhibitor particle size) was smaller than the average particle size of the silica powder used as a raw material. This is presumably because the silica was ground in the ball mill process performed in the preparation of the ceramic matrix slurry. It is considered that, since it was larger than the average particle size (average inhibitor particle size) of silica included in the ceramic matrix prepared in Example 1 and the average distance of the centers of gravity was large, the effect to suppress the sintering of alumina was poor, that is, the effect to suppress the growth of alumina crystal grains constituting the matrix was poor, and the CMC prepared in Comparative Example 2 had a low tensile strength consequently.

Comparative Example 3

375 g (raw-material powder content (slurry): 75.0% by mass) of an α-alumina powder having an average particle size (raw-material particle size) of 0.15 μm and 125 g (25.0% by mass of the mass of the matrix slurry) of pure water were mixed with each other. The resulting mixture was mixed with 1.2 kg of alumina balls having a diameter of 10 mm and subjected to ball milling for 24 hours. Hereby, a matrix slurry having a volume solid component concentration of 43 vol % (solid component concentration: 75% by mass) and a viscosity of 28.6 cP was prepared.

A commercial mullite continuous fiber cloth (i.e., continuous fiber cloth composed of mullite and alumina) (Nextel-720 produced by 3M Company) was subjected to a heat treatment (desizing treatment) at 800° C. in air. The resulting continuous fiber cloth was impregnated with the matrix slurry to prepare a mixture. The mixture was subjected to a heat treatment at 120° C.±10° C. for 6±2 hours twice. Hereby, a green body having a width of 110 mm, a length of 130 mm, and a thickness of 2.1 mm was prepared. The green body was sintered at 900° C. under normal pressure in air to form a calcined body. The calcined body was sintered at 1100° C. for 2 hours in air and subsequently subjected to a heat treatment (sintering) at 1200° C. in air to form a CMC. The CMC had a fiber volume fraction of 43 vol % and a tensile strength of 93 MPa. The tensile strength of the CMC that had been subjected to the heat exposure treatment was 88 MPa, and the strength retention was 95%.

Table below lists the properties of the CMCs prepared in Examples and Comparative Examples.

TABLE 1

| | Average inhibitor particle size (μm) | Average inter-atomic distance (μm) | Strength before heat exposure treatment (MPa) | Strength after heat exposure treatment (MPa) | Strength retention (%) |
|---|---|---|---|---|---|
| Example 1 | 0.11 | 2.0 | 189 | 175 | 93 |
| Example 2 | 0.21 | 2.0 | 189 | 198 | 105 |
| Example 3 | 0.22 | 2.3 | 221 | 192 | 87 |
| Example 4 | 0.15 | 2.7 | 211 | 207 | 98 |
| Example 5 | 0.22 | 1.8 | 189 | 189 | 100 |
| Example 6 | 0.17 | 2.4 | 222 | 211 | 95 |
| Example 7 | 0.11 | 2.2 | 180 | 181 | 100 |
| Comparative Example 1 | 0.29 | 4.9 | 132 | 151 | 114 |
| Comparative Example 2 | 0.68 | 4.8 | 115 | 113 | 98 |
| Comparative Example 3 | — | — | 93 | 88 | 95 |

It was confirmed that, in all of Examples 1 to 7, the average inhibitor particle size was 0.28 μm or less and the strength of the CMC that had not been subjected to the heat exposure treatment was 150 MPa or more. It was also confirmed that the strength retention was 80% or more and the reduction in the strength of the CMC which occurred due to the heat exposure treatment was limited. In contrast, in all of Comparative Examples, the average inhibitor particle size was more than 0.28 μm, and the strength of the CMC that had not been subjected to the heat exposure treatment was less than 150 MPa. That is, the strength of the CMC was low.

It was confirmed that, in all of Examples 1 to 7, the average interatomic distance was 4.5 μm or less. Accordingly, it is considered that, in the CMCs prepared in Examples, the sintering inhibitor particles were dispersed in the matrix in a homogeneous manner.

The entire contents of the specification, claims, drawings, and abstract of Japanese Patent Application No. 2020-216328 filed on Dec. 25, 2020, are cited and incorporated herein as the disclosure of the specification of the present disclosure.

The invention claimed is:

1. A ceramic matrix composite comprising a ceramic matrix and a continuous ceramic fiber, the ceramic matrix including a sintering inhibitor having an average particle size of 0.28 μm or less, wherein an average distance between centers of gravity of particles of the sintering inhibitor is 4.5 μm or less; and wherein a tensile strength of the ceramic matrix composite is 150 MPa or more, and a tensile strength retention after the ceramic matrix composite has been subjected to a heat exposure treatment at 1200° C. for 100 hours is 80% or more.

2. The ceramic matrix composite according to claim 1, wherein the sintering inhibitor is one or more selected from the group consisting of silica, zirconia, yttria, magnesia, mullite and strontium oxide.

3. The ceramic matrix composite according to claim 1, wherein the continuous ceramic fiber is a continuous fiber composed of one or more oxide ceramics selected from the group consisting of alumina, silica, mullite and zirconia.

4. The ceramic matrix composite according to claim 1, wherein the ceramic matrix is one or more oxide selected from the group consisting of alumina, mullite and zirconia.

5. A method for producing the ceramic matrix composite according to claim 1, the method comprising impregnating a continuous ceramic fiber with a ceramic matrix slurry prepared by adding a sintering inhibitor having a purity of 99% or more to a ceramic matrix raw-material powder, subsequently performing drying to prepare a green body, and sintering the green body.

6. The method for producing the ceramic matrix composite according to claim 5, wherein the sintering inhibitor added to the ceramic matrix raw-material powder has an average particle size of more than 0.05 μm and 30 μm or less.

* * * * *